United States Patent [19]
Kawauchi et al.

[11] Patent Number: 5,433,913
[45] Date of Patent: Jul. 18, 1995

[54] METHOD OF MANUFACTURING A HEAT-RESISTANT RESINOUS TUBE

[75] Inventors: Satsuki Kawauchi, Shiga; Yoji Tani, Otsu; Hitoshi Fujiwara, Hyogo, all of Japan

[73] Assignee: I.S.T. Corporation, Shiga, Japan

[21] Appl. No.: 155,151

[22] Filed: Nov. 19, 1993

[51] Int. Cl.⁶ ............................................. B29C 41/08
[52] U.S. Cl. .................................. 264/306; 264/334; 264/347
[58] Field of Search ................... 264/331.19, 204, 304, 264/209.3, 209.4, 342 R, 230, 345, 159, 334, 306, 347

[56] References Cited

U.S. PATENT DOCUMENTS

| | | | |
|---|---|---|---|
| 3,502,762 | 3/1970 | Haller | 264/204 |
| 3,600,361 | 8/1971 | Heacock et al. | 264/345 |
| 3,840,384 | 10/1974 | Reade et al. | 118/405 |
| 4,105,733 | 8/1978 | Bonfanti | 264/108 |
| 4,863,668 | 9/1989 | Griffiths et al. | 264/512 |
| 4,898,702 | 2/1990 | Elkins et al. | 264/159 |
| 5,116,551 | 5/1992 | Davidson et al. | 264/304 |
| 5,176,666 | 1/1993 | Conway et al. | 604/349 |
| 5,201,952 | 4/1993 | Yahagi et al. | 118/109 |

FOREIGN PATENT DOCUMENTS

| | | |
|---|---|---|
| 2130319 | 3/1972 | France . |
| 881625 | 5/1953 | Germany . |
| 4108489 | 10/1991 | Germany . |
| 62-19437 | 1/1987 | Japan . |
| 1-156017 | 6/1989 | Japan . |
| 3-180309 | 8/1991 | Japan . |
| 3-261518 | 11/1991 | Japan . |
| 2070726 | 9/1981 | United Kingdom ............ 264/204 |
| WO88/09092 | 11/1988 | WIPO . |
| WO92/08426 | 5/1992 | WIPO . |

OTHER PUBLICATIONS

European Search Report dated Mar. 7, 1994.
Japanese Patent Abstract of JP1156017 filed Jun. 19, 1989.

Primary Examiner—Jeffery R. Thurlow
Attorney, Agent, or Firm—Fish & Richardson

[57] ABSTRACT

A method of manufacturing and mass-producing a seamless heat-resistant resinous tube with a uniform tube wall thickness and circumference, which includes the steps of coating the precursor solution of a tube material to the surface of a core at a thickness greater than the tube wall thickness; passing a metallic die having a wider inside diameter than the diameter of the core along the outside of the core by utilizing the resistant force of the precursor solution without restricting the metallic die or the core, thus forming a tube around the core; treating the tube around the core to give it strength as a tube; and separating the tube from the core.

7 Claims, 4 Drawing Sheets

METHOD OF MANUFACTURING A HEAT-RESISTANT RESINOUS TUBE

FIELD OF THE INVENTION

The invention relates to a method of manufacturing a heat-resistant resinous tube by using a heat-resistant resin such as polyimide resin, polyamideimide resin, aromatic polyester resin, polyethersulfone resin, polyesterimide resin, polyparabanic acid resin, polyimidazopyrrolone resin, bismaleimidetriazine resin or the like.

BACKGROUND OF THE INVENTION

Heat-resistant resins, which have excellent physical and chemical properties, have been molded in many different shapes and used in various fields. Particularly in the most advanced high-tech fields such as aerospace technology, electronics and the like, heat-resistant resins have been useful because of their heat-resistant property, mechanical strength, dimensional stability and chemical stability.

However, heat-resistant resins require special treatments such as a long heat treatment at high temperature to harden and form the resins into an imide. Molding procedures applied to general plastic materials are not applicable to heat-resistant resins since the simple heat treatments of the molding procedures for general plastic materials do not melt and harden the resins, so that it has been difficult to process heat-resistant resins so as to fully utilize the properties of the resins. In other words, it has been extremely difficult to provide a molding technology for heat-resistant resins.

Tubes made from plastic high polymer materials, rubber, and the like have been developed as conventional seamless tubes with thin tube wall thickness, and their uses are diverse. Methods used for manufacturing these tubes include an injection method, an inflation method, and the like, and it is extremely difficult to manufacture seamless tubes having an even tube wall thickness between several μm and dozens of μm with these methods. The seamless tubes having thin tube walls, which are manufactured by the inflation method, are further thinned, in some cases, through methods of drawing the tubes in a longitudinal direction or passing them between pressure rollers. However, tubes manufactured by these methods still have uneven tube wall thickness.

An example of a conventional method of manufacturing a tube from polyimide resin includes the following steps:

treating the surface of a tetrafluoroethylene-hexafluoropropylene copolymer film with a corona discharge;

heating and laminating a polyimide film on the surface of the copolymer film, thus manufacturing a tape having a two-layer structure;

wrapping a core with the tape at a uniform thickness;

heating and melting the tape wrapped around the core; and extracting the core.

The tubes manufactured by this conventional method, however, cannot be used at a temperature higher than the resisting temperature of tetrafluoroethylene hexafluoropropylene copolymer, and the heat-resistant property of polyimide cannot be fully utilized in the method. In addition, the tubes manufactured by wrapping tape around the core have a spiral structure, and their tube wall thickness is usually uneven.

One example of a method of manufacturing polyimide tubes with uniform tube wall thickness is disclosed in Japanese Published Unexamined Patent Application No. Hei 1-156017. The polyimide tube is manufactured by this method in the following steps:

pouring polyamide acid solution into a molding pipe such as a glass pipe, stainless pipe, or the like with a smooth internal surface;

holding the molding tube in a vertical position;

dropping a bullet-like object through the solution by its own weight, thereby forming a hole inside the solution;

heating and drying the solution inside the molding pipe, thus causing it to become imide by imide reaction and forming a tube; and extracting the tube from the molding pipe.

However, when the polyamide acid solution has high viscosity, the dropping speed of the bullet-like object slows as the polyamide acid solution tends to gather toward the end of the molding pipe. As a result, in the above method, the tube wall thickness tends to be uneven, and there is an upper limit on the diameter of the tubes. Manufacturing costs are also extremely high. Moreover, even if this method can provide polyimide tubes with uniform tube Mall thickness in some experiments, it is difficult to mass-produce the tubes. The final treatments such as drying, hardening and heating the tubes are also difficult.

There has been research on a method of manufacturing a tube with uniform tube wall thickness by using a casting method. Casting methods include a method of dipping a core into a liquefied tube material or precursor material of the tube material and lifting the core from the liquid tube or the precursor material (dipping method), and also a method of spraying the liquefied or powdered precursor material on the surface of a tube, and the like. However, there is an upper limit on the viscosity of the precursor materials, and it is impossible to manufacture a tube with even tube wall thickness as the viscosity of the precursor becomes high. In these methods, the material coated on the core is dried, hardened and reacted, and is separated from the core, thus providing a tube. However, the tube obtained from these processes cannot have a uniform tube wall thickness.

A method of setting a metallic die outside a core formed with a tube material or its precursor material at a certain distance and passing the die along the core can be used for providing a tube with an even tube wall thickness. However, it is hard to keep the core and metallic die parallel even though such parallelism is necessary for providing a tube with a uniform tube wall thickness. It is actually impossible to control and maintain the parallelism and eccentricity between a long core and metallic die within ±10% or less than ±5% of the required level of parallelism and eccentricity.

Heat-resistant seamless tubes with uniform tube wall thickness can be used in conveyor belts for high-performance precision instruments, copiers, picture processing films for laser beam printers, etc., functional materials for precision machines, and the like. In manufacturing tubes for these purposes, the outside surfaces of the tubes should be as smooth as possible, and the inside surface of the tubes should possess the same texture as the core surface.

Even though there have been some proposals for improving seamless tubes such as in Japanese Published Unexamined Patent Application No. Hei 3-180309 and Japanese Published Unexamined Patent Application No. Hei 3-261518, further improvements are required.

SUMMARY OF THE INVENTION

In order to solve the problems of conventional methods, the invention provides a method of efficiently manufacturing and mass-producing heat-resistant resinous tubes at low cost. Moreover, the manufacturing method of this invention can produce heat-resistant tubes with uniform tube wall thickness and circumference. The tube wall thickness is significantly thin at about 3-300 μm; in addition, the tubes are seamless. The outside surfaces of the tubes have a natural surface condition since the outside surfaces are molded in contact with the air; and the inside surfaces of the tubes molded on core surfaces have the same condition as the surface of the cores.

In order to accomplish the above, a method of manufacturing a heat-resistant resinous tube of the invention comprises the following steps:

coating a precursor solution of a tube material to the surface of a core at a thickness greater than the final tube wall thickness;

passing a metallic die which has a wider inside diameter than the diameter of the core along the outside surface of the core by utilizing the resistant force of the viscosity of the precursor solution without restricting the die or the core, thus forming a tube around the core at a certain tube wall thickness;

treating the tube around the core to give it strength as a tube; and separating the tube from the core.

The resistant force of the viscosity of the precursor solution is utilized by adjusting the distance between the core surface and the inside surface of the metallic die plus the weight of the die, thus providing a tube with an even tube wall thickness. For example, when the resistant force of the viscosity is relatively high, the distance between the core surface and the inside surface of the metallic die should be relatively wide and/or the weight of the die should be relatively heavy, thus controlling the dropping speed of the die along the core to provide a tube with an even tube wall thickness.

It is preferable in this composition that the viscosity of the precursor solution and the weight of the metallic die or the core are adjusted to keep the speed at which the metallic die is passed along the outside of the core between 2 mm/sec and 210 mm/sec.

It is also preferable in this composition to allow the metallic die to drop down around the outside of the core by its own weight.

It is further preferable in this composition that the precursor solution of a tube material is at least one precursor solution selected from the group consisting of a polyimide resin precursor solution, polyamideimide resin precursor solution, aromatic polyester resin precursor solution, polyethersulfone resin precursor solution, polyesterimide resin precursor solution, polyparabanic acid resin precursor solution, polyimidazopyrrolone resin precursor solution, and bismaleimidetriazine resin precursor solution.

It is preferable in this composition that the precursor solution is a monomer for forming polyimide and/or an oligomer for forming polyimide.

It is also preferable in this composition that the viscosity of the precursor solution is 50-10000 poise.

It is further preferable in this composition that the treatment for providing strength to the tube is a heat treatment.

It is preferable in this composition that the temperature is raised by stages during the heat treatment.

It is also preferable in this composition that the tube wall thickness of the heat-resistant resinous tube is 3-300 μm.

It is preferable in this composition that the outside surface of the heat-resisitant tube is conditioned by the air and that the inner surface of the tube has the same surface condition as the core.

A method of forming a tube of high quality on the surface of a core comprises the steps of:

coating a precursor solution of a tube material on the surface of the core at a thickness greater than the final tube wall thickness;

passing a metallic die along the outside of the core by utilizing the resistant force of the viscosity of the precursor solution without restricting the die or the core, thus forming the tube around the core;

drying, hardening, and heating the tube or extracting a solvent from the tube to provide strength to be tube;

separating the tube from the core, thus providing a tube with a uniform tube wall thickness of 3-300 μm.

The outside surface of the tube is conditioned by the air; the inner surface condition has the same surface condition as the core.

More specifically, a method of uniformly applying the precursor solution of a tube material to the surface of a core comprises the following steps:

coating a precursor solution on the surface of the core at a thickness greater than the final tube wall thickness by dipping the core into the precursor solution, applying the precursor solution with a brush, or using general application methods such as a flow coating method; and passing and dropping the metallic die along the outside of the core by its own weight;

or alternatively, pulling the core such as with a thread or string while the metallic die is fixed with or without certain flexibility.

As a result, the tube around the core is molded at a uniform tube wall thickness. The speed of passing the metallic die along the outside of the core depends significantly on the viscosity of the precursor solution; however, the speed is preferably 2-210 mm/sec.

Thereafter, the tube around the core is heated, naturally dried, hardened by heat, or has its solvent extracted to provide strength to the tube. After being separated from the core, a tube with a uniform tube wall thickness and circumference is provided.

The method of the invention is able to provide a tube with a wall thickness of 3-500 μm and is suitable for manufacturing a tube using a precursor solution of a tube material that has a viscosity of 50-10000 poise. A step of treating the surface of a tube with another material can also be included in the method of this invention.

DETAILED DESCRIPTION OF THE INVENTION

Figure 1:
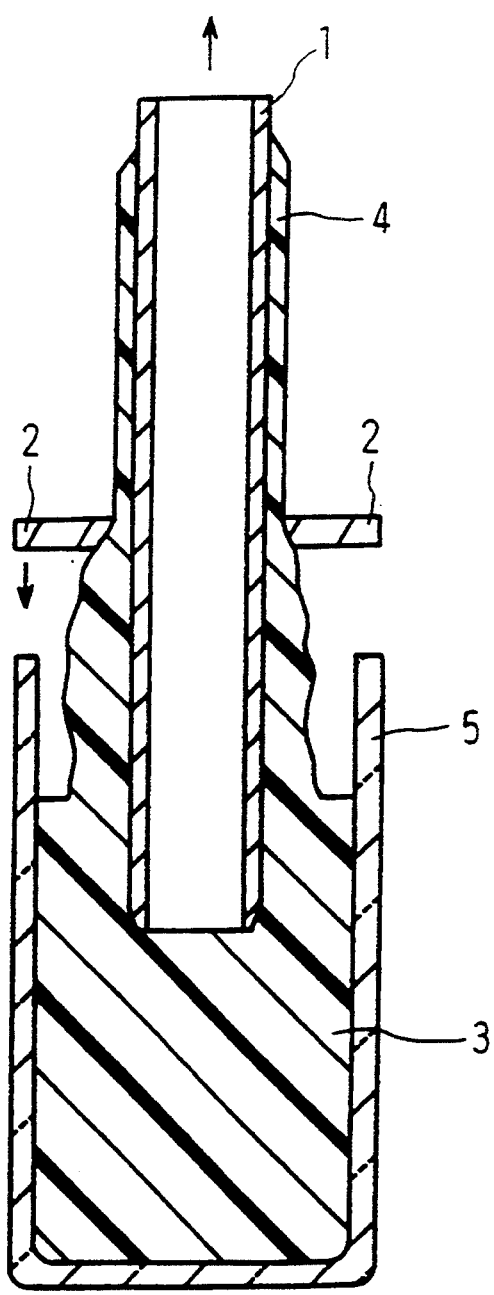
FIG. 1 shows a cross-sectional view of a manufacturing method of one example using a core and a metallic die.

It is extremely difficult to manufacture a thin seamless tube with a uniform tube wall thickness from a resin— which is thermosetting and heat reversible but has high heat-resistant temperature and melting point, such as polyimide resin, polyamideimide resin, aromatic polyester resin, polyethersulfone resin, polyesterimide resin, polyimidazopyrrolone resin, polyparabanic acid resin, and bismaleimidetriazine resin. Since these heat-resistant resins can hardly be transformed and molded as a tube with a uniform thin tube wall thickness in a melted condition, intermediates or precursers of heat-resistant resins, which are treated with solvents or the like to form a gel or varnish before the drying, hardening and reacting steps, can be used for molding the tubes instead. These intermediates or precursors include the intermediate created by the reaction of aromatic tetracarboxylic acid anhydride (polyamide acid), the intermediate of polymellitic acid anhydride and aromatic diamime, polyesterimide intermediate, polyethersulfone intermediate, aromatic diamine acid ester resin intermediate, bismaleimidetriazine resin intermediate, polybenzoimidazole intermediate, polyparabanic acid intermediate or the like.

Metallic materials such as stainless steel, aluminum, iron or the like with plated surface, glass pipes and rods, and the like can be used as a core material. The surface of the core material is cut, scraped or molded to have a preferable surface condition for an inside tube surface.

If necessary, a material for easily separating the tube from the core can be applied to the core surface. For instance, silicone or fluororesin, which can tolerate the temperature during the process of heat treatment, can be applied to the core.

The core is then dipped and lifted from a material such as the precursor solution of polyimide resin, and the solution is coated on the surface of the core. The thickness of the coated precursor solution around the core is irregular. Methods of adhering the polyimide resin precursor solution to the core include a method of pouring the solution on the core, a method of applying the solution to the core with a brush and the like.

The metallic die is located on the top edge of the core while the distance between the die and the core is kept at the desired tube wall thickness; the metallic die is dropped along the core by its own weight. The dropping speed of the die depends on the viscosity of the precursor solution and the weight of the die.

The dropping speed of the die is an important factor in determining the uniformity of the tube wall thickness. For example, under the conditions of high viscosity of the precursor solution of a tube material, short distance between the core surface and the inside surface of the metallic die, and light weight of the die, the dropping speed of the die along the core becomes extremely slow, thus providing a tube with an uneven tube wall thickness. On the other hand, when the viscosity of the precursor solution is low or the distance between the inside surface of the die and the core surface is extremely wide, the die drops along the core without much resistance from the solution, thereby providing a tube with the wall thickness favoring one side.

Even though the uniformity of the tube wall thickness depends on many factors such as the thickness of the precursor solution on the core, the core diameter, the weight of the core, the shape of the core, etc., it has been found that a tube with uniform wall thickness can be obtained with a 2–210 mm/sec dropping speed of the mold. This can be achieved by a method of fixing the metallic die with or without some flexibility and pulling the core with a string, thread and the like at 2–210 mm/sec. This method can be applied even when the core is extremely thin and prone to bending (for example, wire). A method of dropping the core through the metallic die fixed with or without some flexibility is also applicable to the invention.

It is preferable that the viscosity of the precursor solution is 50–10000 poise. In other words, the passing speed of the die tends to be too fast when the viscosity is less than 50 poise, thus providing a tube with an uneven tube wall thickness. It is also difficult to provide a tube with even tube wall thickness if the viscosity is greater than 10000 poise.

Figure 2:
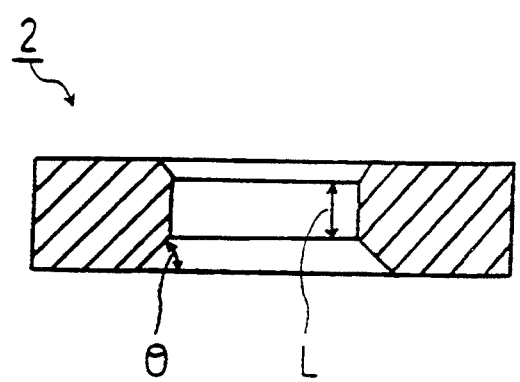
FIG. 2 shows a cross-sectional view of a die of another example.
Figure 3A:
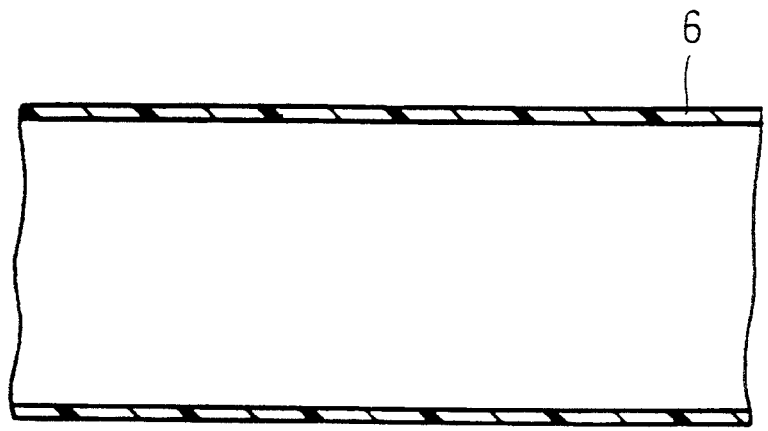
FIG. 3(a) and 3(b) show cross-sectional views of a seamless polyimide tube of another example in longitudinal direction (a) and diameter direction (b).
Figure 3B:
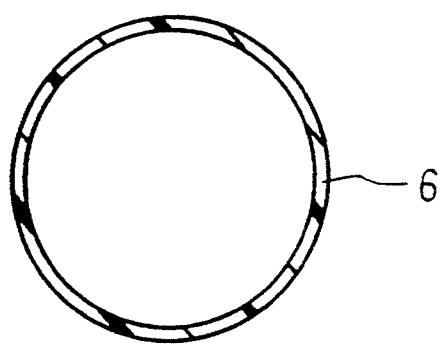

FIG. 1 shows a cross-sectional view of one example of a manufacturing method using a core 1 and a metallic die 2. Core 1 is dipped in a polyimide resin precursor solution 3 inside a vessel 5. After adhering polyimide resin precursor solution 3 to core 1, metallic die 2 is placed at a certain distance from core 1. Either by lifting core 1 or dropping metallic die 2 by its own weight, a polyimide resin precursor tube 4 is formed around core 1 with a uniform tube wall thickness. Then, the solvent is removed from polyimide resin precursor tube 4 by drying the tube around core 1, thus making the tube dense. After reacting the tube to form an imide by heating at high temperature, the tube is separated from core 1, thus providing a seamless tube 6. FIG. 2 shows a cross-sectional view of metallic die 2. Land length is indicated as L in FIG. 2; $\theta$ is the liquid contact angle. The cross-sectional views of seamless tube 6 are shown in FIGS. 3(a) and (b). FIG. 3(a) shows a cross-sectional view of seamless tube 6 in a longitudinal direction; FIG. 3(b) shows a cross-sectional view of the tube in a diameter direction.

The following tables 1, 2 and 3 show the correlation between tube wall thickness and the speed of passing a die along a core, the correlation between tube wall thickness and the viscosity of a precursor solution of a tube material, and the correlation between the diameter of a core and the speed of passing a die along the core.

⊚ in the tables indicates the most preferable results; ○ indicates adequate characteristics of a tube.

TABLE 1

| Correlation between tube wall thickness and the speed of passing a metallic die along a core | | | | |
|---|---|---|---|---|
| Tube Wall Thickness ($\mu$m) | Viscosity of Precursor (poise) | Diameter of Core ($\phi$mm) | *Passing Speed (mm/sec) | Result |
| 3 | 500 | 20 | 1.5 | **wavy |
| 5 | 500 | 20 | 2.2 | ○ |
| 10 | 500 | 20 | 3 | ⊚ |
| 20 | 500 | 20 | 16 | ⊚ |
| 50 | 500 | 20 | 61 | ⊚ |
| 100 | 500 | 20 | 186 | ⊚ |
| 200 | 500 | 20 | 210 | ⊚ |
| 300 | 500 | 20 | 192 | ○ |

TABLE 1-continued

Correlation between tube wall thickness and the speed of passing a metallic die along a core

| Tube Wall Thickness (μm) | Viscosity of Precursor (poise) | Diameter of Core (φmm) | *Passing Speed (mm/sec) | Result |
|---|---|---|---|---|
| 300 | 500 | 20 | 225 | *** |

*Speed of passing a metallic die along the outside of a core
**Surface condition of a tube being wavy
***Tube wall thickness inclined at one side

TABLE 2

Correlation between the viscosity of a precursor solution of a tube material and the speed of passing a metallic die along the outside of a core

| Tube Wall Thickness (μm) | Viscosity of Precursor (poise) | Diameter of Core (φmm) | *Passing Speed (mm/sec) | Result |
|---|---|---|---|---|
| 40 | 30 | 40 | 218 | ***** |
| 40 | 100 | 40 | 636 | ○ |
| 20 | 50 | 20 | 63 | ○ |
| 40 | 500 | 20 | 22 | ⊚ |
| 40 | 2000 | 20 | 13 | ⊚ |
| 40 | 5000 | 20 | 21 | ⊚ |
| 40 | 10000 | 20 | 9 | ○ |
| 40 | 12000 | 20 | 1.8 | **wavy |

*****sagging precursor solution on a tube surface

TABLE 3

Correlation between a core diameter and the speed of passing a die along the outside of a core

| Tube Wall Thickness (μm) | Viscosity of Precursor (poise) | Diameter of Core (φmm) | *Passing Speed (mm/sec) | Result |
|---|---|---|---|---|
| 3 | 50 | 2 | 17 | ○ |
| 5 | 50 | 20 | 3 | ○ |
| 40 | 1000 | 100 | 60 | ○ |
| 40 | 1000 | 1000 | 45 | ○ |

After adhering the precursor solution of a tube material to the surface of the core, the precursor solution is dried naturally or with heat, hardened, and reacted, and then its solvent is extracted, etc., and the solution is held on the core until it reaches the stage of maintaining its strength as a tube. When polyimide is used as a tube material, the polyimide resin precursor tube around the core should be heated and dried at 120–200° C., thus removing the solvent contained in the polyimide resin precursor tube and obtaining strength as a tube. After reacting the tube to form an imide to some extent or thoroughly by heating or the like, the tube is forcibly separated from the core. The outside surface of the tube has a natural surface condition since it is molded in contact with the air; the inside surface of the tube reflects the condition of the core surface. By imparting particular surface conditions to the core, the inside surface condition of the tube can be controlled.

Figure 4:
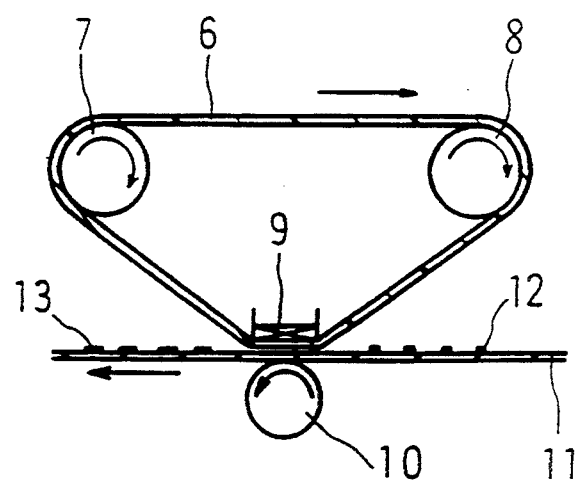
FIG. 4 shows a cross-sectional view of a deposition mechanism of an electronic photo apparatus using a polyimide tube of another example.

A polyimide seamless tube of the invention can be used for, as an example, an electronic photo deposition apparatus of FIG. 4. More specifically, the deposition apparatus is composed of a drive roll 7, a tension roll 8 and a heater 9 provided inside a polyimide tube 6 and a back-up roll 10 provided outside thin polyimide tube 6. The deposition apparatus has a mechanism for supplying copying paper 11 formed with toner 12 between polyimide tube 6 and back-up roller 10, and constantly depositing toner by heating copying paper 11 with heater 9, thus providing fixed image 13.

Polyimide resin precursor solution used in the invention is prepared, for example, by reacting aromatic tetracarboxylic acid with aromatic diamime in an organic polar solvent. For instance, 3,3',4,4'-biphenyltetracarboxylic acid di-anhydride; 2,3',4,4'-benzophenonetetracarboxylic acid di-anhydride; pyromellitic acid di-anhydride; or a mix of these tetracarboxylic acids can be used as aromatic tetracarboxylic acid. However, the aromatic tetracarboxylic acid is not limited to these acids. Aromatic diamimes include, diphenylether diamimes such as 3,3'-diaminophenylether, 3,3'-dimethoxy-4,4'-diaminodiphenylether, 4,4'-diaminophenylether and the like; diphenylthioether diamimes such as 3,3'-diphenylthioether, 4,4'-diaminodiphenylthioether and the like; benzophenone diamimes such as 4,4'-diaminobenzopheneo and the like; diphenylmethane diamine; paraphenylene diamine; m-phenylenediamime and the like can be included; and the aromatic diamine is not restricted to these diamines. N-methyl-2-pyrolidone, dimethylformamide, dimethylacetamide, phenol, o-cresol, m-cresol, p-cresol, dimethloxide and the like are examples of suitable organic polar solvents. However, the organic polar solvent is not limited to these solvents.

Besides polyimide, the presursor solution of polyimidazopyrrolone which is prepared by reacting diaminobenzidine with pyromellitic acid anhydride solution can also provide a uniform tube wall thickness.

The invention will now be explained specifically in the following examples.

EXAMPLE 1

The manufacturing method illustrated in FIG. 1 was used in this example. A stainless steel rod 40 mm in outside diameter and 1000 mm long was treated to have a satin finished surface, and this surface was thinly coated with silicone oil and dried, thus providing the core of this example.

Polyimide resin precursor solution was prepared by reacting 3,3',4,4'-biphenyl tetracarboxylic acid di-anhydride having 1000 poise viscosity with aromatic diamime in N-methyl-2-pyrolidone. The core was dipped and held in the prepared polyimide resin precursor solution up to 800 mm. Then, an aluminum ring 40.5 mm in inside diameter, 45° in liquid contact angle (FIG. 2: $\theta$), 665 g in weight and 3 mm in land length (FIG. 2: L) slid down along the core by its own weight. Although the ring dropped rapidly at the beginning of the sliding process, the sliding speed soon became constant due to the resistant force of viscosity of polyimide resin precursor solution. The sliding speed of the outside ring was 7.2 mm/sec. When the ring reached the bottom of the core, it was removed from the core. The core was then dried in a furnace at 120° C. for 30 minutes, at 200° C. for 20 minutes, at 300° C. for 60 minutes and then 350° C. for 60 minutes, thus letting the polyimide resin precursor become imide. The core was taken out from the furnace and cooled in the air. After checking whether or not the coated polyimide resin precursor solution sags down or sticks to fingers, the coated material was separated from the core carefully, thus providing a tube with a uniform tube wall thickness except the top and bottom 3 cm edges. The tube wall thickness was 22 μm±1 μm, and the circumference of the tube was 40 mm±2% of diameter. The difference in circumference at the bottom, center and top side of the tube was within 1%.

A chart showing the surface roughness of the inside tube surface indicates a satin finished surface, which is exactly the same as the surface condition of the core. According to the measurement of JIS B0601, the fineness (Rz) of the outside tube surface was less than 1 μm since the surface was molded in contact with the air.

Comparative Example 1

Under the same conditions as Example 1, the core was dipped and held in a tank containing polyimide precursor solution after setting a metallic ring above the core at a fixed distance between the core and the inside diameter of the ring. The core coated with polyimide precursor solution was mechanically passed through the ring at 20 mm/sec. As a result, a polyimide precursor tube was molded around the core with a tube wall thickness of 500 μm. Then, the ring was removed from the core.

Under the same conditions as Example 1, the tube was heated and reacted to form the imide completely. The average tube wall thickness was 42 μm, and the difference between the thickest tube wall thickness and the thinnest tube wall thickness was 16 μm. The procedures applied in this example were tested many times, and the test results were various. Notably, thin parts of the tubes had unnatural concave and convex surfaces. Because of these reasons, the tubes did not meet the criteria for a desirable tube.

Comparative Example 2

The same procedures of Example 1 were directed in this example, except that the weight of an aluminum ring was changed to 2025 g. Polyimide precursor solution was adhered to the surface of the core. The ring with 40.5 mm in inside diameter, 2025 g in weight and 45° in liquid contact angle (FIG. 2: θ) was set on the top edge of the core. As the ring slid down along the core, it lost its parallelism. Without being balanced with the resistance force of the polyimide precursor solution, the core dropped rapidly, and a tube with an uneven tube wall thickness was provided.

Comparative Example 3

A polished cylindrical stainless steel pipe 40 mm in outside diameter, 20 mm in inside diameter and 1 mm long, and a cylindrical stainless steel rod 19.5 mm in diameter and 30 mm long were prepared. One edge of the rod was curved conically 5°. After applying the silicone diluent solution of Example 1 to the inside surface of the pipe, the polyimide precursor solution used in Example 1 was sprayed inside the pipe. Then, the rod was dropped into the pipe by its own weight, but the rod ceased dropping without reaching the bottom of the pipe. The rod weighed about 75 g and was estimated to be too light to reach the bottom. A rod 240 mm in length and about 600 g in weight was then dropped from the top side of the pipe. However, again, the rod did not go through the pipe, and no tube was provided in this example.

EXAMPLE 2

The same metallic die, core and precursor solution of Example 1 were used in this example. However, unlike in Example 1, a string was attached to the center of the top side of the core while the die was fixed in this example. The core, coated with the precursor solution, was lifted from below through the die at a constant speed by pulling the string. The core was flexible enough to be controlled and managed to keep its parallelism due to the precursor solution. The lifting speed of the core was 7.2 mm/sec. Then, the same treatments of Example 1 were directed to the solution coated on the core, thus providing a tube with uniform tube wall thickness. The tube of this example was exactly the same as the tube of Example 1.

Comparative Example 4

The same procedures of Example 1 were directed in this example, except that the viscosity of the polyimide precursor was raised to 20000 poise. Since the metallic die did not slide on the outside core, a tube was not provided in this example.

Comparative Example 5

The same procedures of Comparative Example 4 were directed in this example, except that the weight of the metallic die was changed to 5000 g. The sliding speed of the die was 217 mm/sec, and the die did not slide smoothly. Therefore, a tube with an even tube wall thickness was not obtained.

EXAMPLE 3

A glass rod 10 mm in outside diameter and 2 m long, and an outside metallic ring 10.8 mm in inside diameter and 5000 g in weight were prepared. A precursor solution of bismaleimidetriazine resin having 500 poise viscosity was prepared by reacting bismaleimide with cyanic acid ester solution. The precursor solution was then applied to the glass rod. The metallic die slid from the top of the rod at 198 mm/sec. The solution coated around the core was heated and hardened at 300° C. for three hours, and was separated from the glass rod, thus providing a tube. 50 mm of each top and bottom edge of the tube were cut off, and a tube about 1.8 m in length was provided. The tube had an inside diameter of 10 mm and was 53 μm±2% in thickness, and was a seamless tube with a uniform tube wall thickness. The surface roughness of the outside surface and inside surface of the tube was measured. Since the glass rod was used as the core, the inside surface of the tube was extremely smooth. More specifically, Rz of the outside surface was less than 1 μm while Rz of the inside surface was less than 1.5 μm.

EXAMPLE 4

The surface of an aluminum core 180 mm in outside diameter and 500 mm long was roughened slightly by a sand blasting method. Then, polytetrafluoroethylene resin was applied to the aluminum core, thus providing the core for this example. The surface roughness of the core was Rz 3.0 μm. The top side of the core was attached to three wires, and the core was lifted in the air.

Polyimide precursor solution was prepared by reacting 3.3',4.4'-biphenyl tetracarboxylic acid anhydride with aromatic diamime in N-methyl-2-pyrolidone. The core surface was coated at about 1 mm or more in thickness and 430 mm in length with the polyimide precursor solution by using a brush. An aluminum die 181 mm in inside diameter, 1050 g in weight and 30° in liquid contact angle (FIG. 2: θ) was dropped from the top of the core. Due to the resistant force of the polyimide precursor solution, the aluminum die was balanced, and slid along the core by its own weight. The tube was formed around the core while the parallelism and eccentricity between the core and the die was naturally adjusted without restricting both the core and the ring. The tube wall thickness was 0.5 mm.

The average sliding speed of the die was 10.0 mm/sec.

The tube around the core was then heated at 150° C. for 80 minutes and at 230° C. for 30 minutes, thus forming the tube into an imide. The tube was cooled, and was separated from the core. As a result, a tube with 180 mm in inside diameter and 300 mm long was provided in this example.

The tube was then put on a stainless steel core 180 mm in outside diameter. The surface of the tube was coated with a copolymer in a mixed solution in which tetrafluoroethylene resin and tetrafluoroethylene parfluoroalkylvinylether are mixed, and was dried. The tube was heated at 300° C. for 40 minutes and at 400° C. for 50 minutes, and then was cooled down to room temperature. The tube was separated from the core, thus providing a polyimide tube coated with fluororesin on its surface. The tube wall thickness was 45 μm, and unevenness in the thickness was ±2.3 μm.

The length of the tube within the range of ±2.3 μm uneven tube wall thickness was 380 mm. The outside surface roughness of the tube was Rz 0.2 μm, and the inside surface roughness was Rz 2.8–3.0 μm.

When the tube of this example was used for a copier picture processing film, the film exhibited a high performance.

As explained above, after coating a precursor material to a core uniformly, the coated precursor material of a heat-resistant resin is heated, dried naturally, and hardened by heat, then its solvent is extracted, and the like, thus maintaining its strength as a tube. The coated precursor material is then separated from the core, thereby providing a tube with a uniform tube wall thickness and circumference.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A method of manufacturing a heat-resistant resinous tube comprising:

coating a precursor solution selected from the group consisting of polyamide resin precursor solution, polyamideimide resin precursor solution, aromatic polyester resin precursor solution, polyethersulfone resin precursor solution, polyesterimide resin precursor solution, polyparabanic acid resin precursor solution, polyimidazopyrrolone resin precursor solution, and bismaleimidetriazine resin precursor solution of a heat-resistant resin on a surface of a core at a thickness greater than a tube wall thickness of said heat-resistant resinous tube;

preparing a metallic die with an inside diameter wider than the diameter of said core;

passing said metallic die along the outside of said core by utilizing the resistant force of said precursor solution without restricting at least one of said metallic die and said core, thus forming a tube around said core;

treating said tube on said core to provide strength to said heat-resistant resinous tube; and separating said tube from said core, wherein the viscosity of said precursor solution and the weight of said metallic die and said core are adjusted to keep the speed of passing said metallic die along the outside of said core between 2 mm/sec and 210 mm/sec, and wherein the viscosity of said precursor solution is between 50 poise and 10000 poise.

2. A method according to claim 1, wherein said metallic die passes along the outside of said core by its own weight.

3. A method according to claim 1, wherein said precursor solution comprising at least one member selected from the group consisting of a monomer for forming polyimide and an oligomer for forming polyimide.

4. A method according to claim 1, wherein the treatment for providing tube strength is a heating treatment.

5. A method according to claim 4, wherein temperature is raised in stages in said heating treatment.

6. A method according to claim 1, wherein the tube wall thickness of said heat-resistant resinous tube is between 3 μm and 300 μm.

7. A method according to claim 1, wherein an outside surface of said heat-resistant resinous tube is conditioned by the air, and wherein the inside surface condition of said heat-resistant resinous tube has the surface condition of the core surface.

* * * * *